United States Patent
Lam et al.

(10) Patent No.: US 8,414,266 B2
(45) Date of Patent: Apr. 9, 2013

(54) TRAVERSE AXIS FLUID TURBINE WITH CONTROLLABLE BLADES

(76) Inventors: Chi Hung Louis Lam, Tseung Kwan (HK); Chun Yu Ronald Lam, Tseung Kwan (HK)

( * ) Notice: Subject to any disclaimer, the term of this patent is extended or adjusted under 35 U.S.C. 154(b) by 940 days.

(21) Appl. No.: 12/500,330

(22) Filed: Jul. 9, 2009

(65) Prior Publication Data

US 2010/0080706 A1    Apr. 1, 2010

Related U.S. Application Data

(60) Provisional application No. 61/100,269, filed on Sep. 26, 2008.

(51) Int. Cl.
*F03D 7/06* (2006.01)
*F03D 3/06* (2006.01)
*F03D 3/00* (2006.01)

(52) U.S. Cl. .......................................................... 416/147

(58) Field of Classification Search ................... 415/4.2, 415/4.4, 907; 416/9, 12, 17, 24, 100, 112, 416/113, 115, 116, 132 B, 167
See application file for complete search history.

(56) References Cited

U.S. PATENT DOCUMENTS

| | | | | |
|---|---|---|---|---|
| 1,986,752 A * | 1/1935 | Rorvik | | 416/89 |
| 3,902,072 A * | 8/1975 | Quinn | | 290/44 |
| 4,113,408 A | 9/1978 | Wurtz et al. | | |
| 4,186,313 A | 1/1980 | Wurtz | | |
| 4,321,005 A * | 3/1982 | Black | | 415/4.2 |
| 4,822,239 A | 4/1989 | Tsipov | | |
| 5,195,871 A * | 3/1993 | Hsech-Pen | | 416/12 |
| 6,853,096 B1 | 2/2005 | Yu et al. | | |
| 6,864,597 B1 * | 3/2005 | Ricker | | 290/55 |
| 2003/0059306 A1 * | 3/2003 | Miller | | 416/132 B |
| 2003/0161729 A1 | 8/2003 | Lindhorn | | |
| 2005/0123402 A1 * | 6/2005 | Lim | | 416/100 |
| 2006/0078416 A1 * | 4/2006 | Haworth | | 415/4.2 |
| 2008/0121752 A1 * | 5/2008 | Chen | | 244/13 |
| 2009/0016884 A1 * | 1/2009 | Yan | | 416/147 |

FOREIGN PATENT DOCUMENTS

| | | |
|---|---|---|
| CN | 101021203 A | 8/2007 |
| DE | 102005011501 A1 | 9/2006 |
| EP | 1541866 A2 * | 6/2005 |
| WO | 2006041464 A1 | 4/2004 |

* cited by examiner

*Primary Examiner* — Nathaniel Wiehe
*Assistant Examiner* — Joshua R Beebe
(74) *Attorney, Agent, or Firm* — Stephen B. Salai, Esq.; Harter Secrest & Emery LLP

(57) ABSTRACT

An improved transverse axis fluid turbine and system thereof are disclosed. The turbine has a base structure, rotor rotatably attached to the base structure, and at least three blades rotatably attached to the rotor. The blade has an elongated member, having first and second ends, and a blade member, the first end being rotatably attached to the rotor and the blade member is attached to the second end. The first end has a helical gear. An actuating device is disposed in the rotor and engages with the helical gear with a corresponding gear to control and actuate rotation of the blade. The rotation is controlled to maximize the effective exposed area of the blade when the blade moves in the direction of the flowing fluid and minimize the area when the blade moves thereagainst. The actuating device can be controlled by a direction vane to accommodate changes in direction of fluid flow.

14 Claims, 16 Drawing Sheets

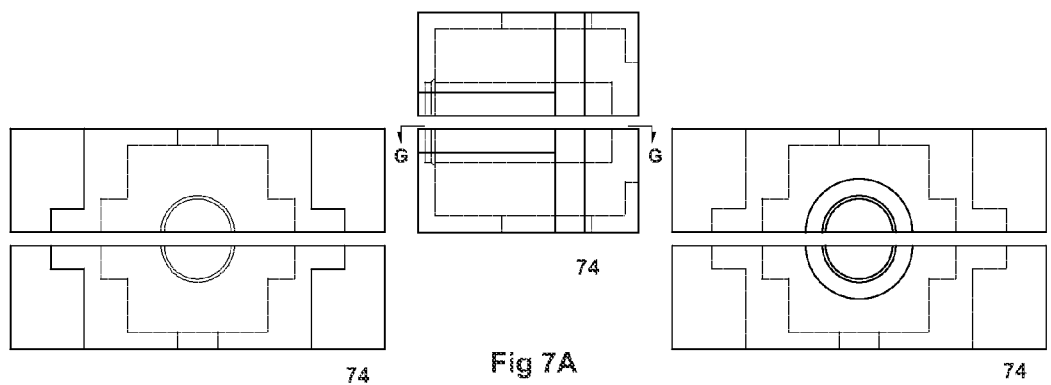
Fig 7B  Fig 7A  Fig 7C
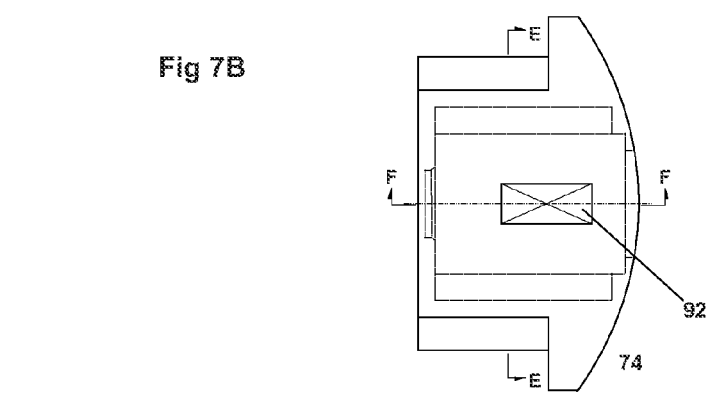
Fig 7D
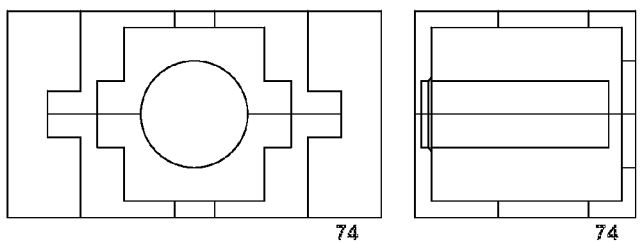 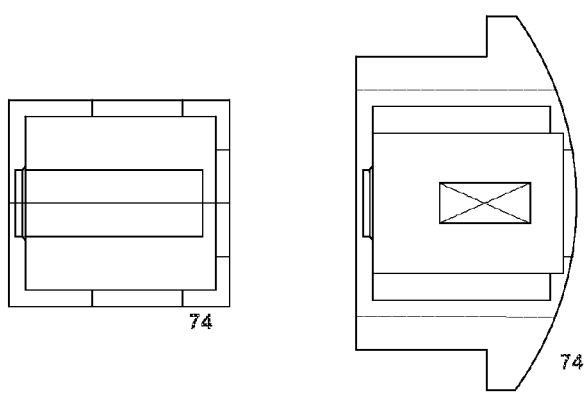
Fig 7E  Fig 7F  Fig 7G

TRAVERSE AXIS FLUID TURBINE WITH CONTROLLABLE BLADES

CROSS-REFERENCE TO RELATED APPLICATIONS

This Application claims priority from U.S. Provisional Patent Application Ser. No. 61/100,269, filed on Sep. 26, 2008, the teachings of which are incorporated herein by reference.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

REFERENCE TO A "SEQUENCE LISTING"

Not Applicable.

BACKGROUND OF THE INVENTION

1. Field of the Invention

This application relates to a turbine in fluid, particularly to a turbine with the axis of rotation lying in a plane transverse to the direction of flow of the fluid.

2. Description of Related Art

A number of transverse axis wind turbines, such as U.S. Pat. Nos. 4,113,408, 4,186,313, 4,822,239, 5,195,871, 6,853,096 and 6,619,921 German Patent Application Publication Number DE 10 2005 011 501 A1, Chinese Patent Application Publication Number CN 101021203A, PCT International Application Publication Number WO 2006/041464, and European Patent Application Publication No. 1541866 have been proposed with various controlled rotatable blades according to the direction of flows.

As it is shown, there have been standing needs for a fluid turbine that would provide any improvement from the existing fluid turbines and that meets one or more of the requirements shown above.

Long in human history, the dynamic energy in flowing fluid has been used to help irrigation and carry out farm works. Water wheels and windmills were built to capture energy in flowing water and wind. As more and more sophisticated techniques were developed, many types of machines were constructed and these machines were generally named as turbines.

In general, turbines with the axis of rotation parallel to the direction of flow are called axial flow turbines and those with the axis of rotation lying in a transverse plane (a plane that is perpendicular to the direction of flow) are called transverse axis turbines. Turbines are also described as horizontal axis or vertical axis turbines depending respectively on the orientation of the axis of rotation of the turbine.

Turbines may also be classified according to the working principle that they employ to extract energy from the flowing fluid. If the rotation is energized by lift force, the turbine is said to be of the lift type. Similarly, if drag force is used, the turbine is of the drag type. There are also hybrid turbines which make use of both lift and drag forces.

For a fluid turbine to be practical, at least several of the following requirements have to be fulfilled:

1. Low equipment fabrication cost;
2. Low equipment transportation cost to site;
3. Low site construction and erection costs;
4. Low maintenance cost;
5. High energy capturing to total cost ratio;
6. Energy capturing power of the turbine or turbine system can be designed to suit local topographic and environmental conditions;
7. Ability to operate in both laminar and turbulent fluid flow;
8. Ability to self start at low fluid speed;
9. Ability to handle high fluid speed without causing damage to the system;
10. Ability to operate continuously year round in all weather conditions;
11. High energy capture ratio with respect to the foot print of the turbine;
12. High energy capture ratio with respect to the exposed frontal projected area of the turbine facing the flowing fluid;
13. High exposed area to the flowing fluid with respect to the foot print of the turbine;
14. Low noise level during operation; and/or
15. Low environmental impact including change of ecology and hazard to living things.

BRIEF SUMMARY OF THE INVENTION

An object of the present invention is to provide a practical transverse axis turbine and turbine system in fluid.

Another object of the present invention is to provide an improved transverse axis fluid turbine.

Yet another object of the present invention is to provide a means to change and control the drag on the blade of a fluid turbine, or effective exposed area of the blade to flowing fluid.

Yet another object of the present invention is to provide a suitable structural support in a fluid turbine to enhance or to improve efficiency of extracting energy from fluid flow.

According to one embodiment of the present invention, it provides a transverse axis turbine having at least three blades attached radially and rotatably to the rotor shaft. The angular position of the blade with respect to its own longitudinal axis of the blade can be adjusted to increase or reduce drag on the blade as required. In particular, the angular position of the blade about its own longitudinal axis can be adjusted appropriately to follow fluid flow direction changes. The angular position adjustment for the blade is accomplished by a mechanism installed inside the rotor shaft. These special features enhance the ability of the turbine to capture energy in the flowing fluid and convert it to torque force transmitted by the rotating rotor shaft.

A plurality of such blades can be joined together on a common rotor shaft to form a turbine module. Such module provides a larger frontal area for capturing energy in the flowing fluid and enhances the efficiency of the system.

The turbine module can also be installed inside an open frame structure having a polygonal prism shape. Such structure enables the turbine modules to be joined further together to form larger installations to capture energy from flowing fluid. A wall of turbines can be built by joining modules side by side and stacking them up to form a large self standing planar structure.

The present invention may best be understood and will become apparent from the following description with referencing to the accompanying drawings.

BRIEF DESCRIPTION OF THE SEVERAL VIEWS OF THE DRAWING

Terms used to describe the turbine refer to a transverse axis turbine on a vertical axis unless otherwise stated.

FIG. 7A shows a front elevation view of upper and lower halves of a sliding collar housing;

FIG. 7B shows a side elevation view of the left end (or the end facing towards the inner rotor shaft) of the sliding collar housing;

FIG. 7C shows a side elevation view of the right end (or the end interfacing with the connector) of the sliding collar housing;

FIG. 7D shows a top plan view of the sliding collar housing;

FIG. 7E shows a sectional view of the sliding collar housing in FIG. 7D at the position E-E;

FIG. 7F shows a sectional view of the sliding collar housing in FIG. 7D at the position F-F;

FIG. 7G shows a sectional view of the sliding collar housing in FIG. 7A at the position G-G;

DETAILED DESCRIPTION OF THE INVENTION

Figure 1:
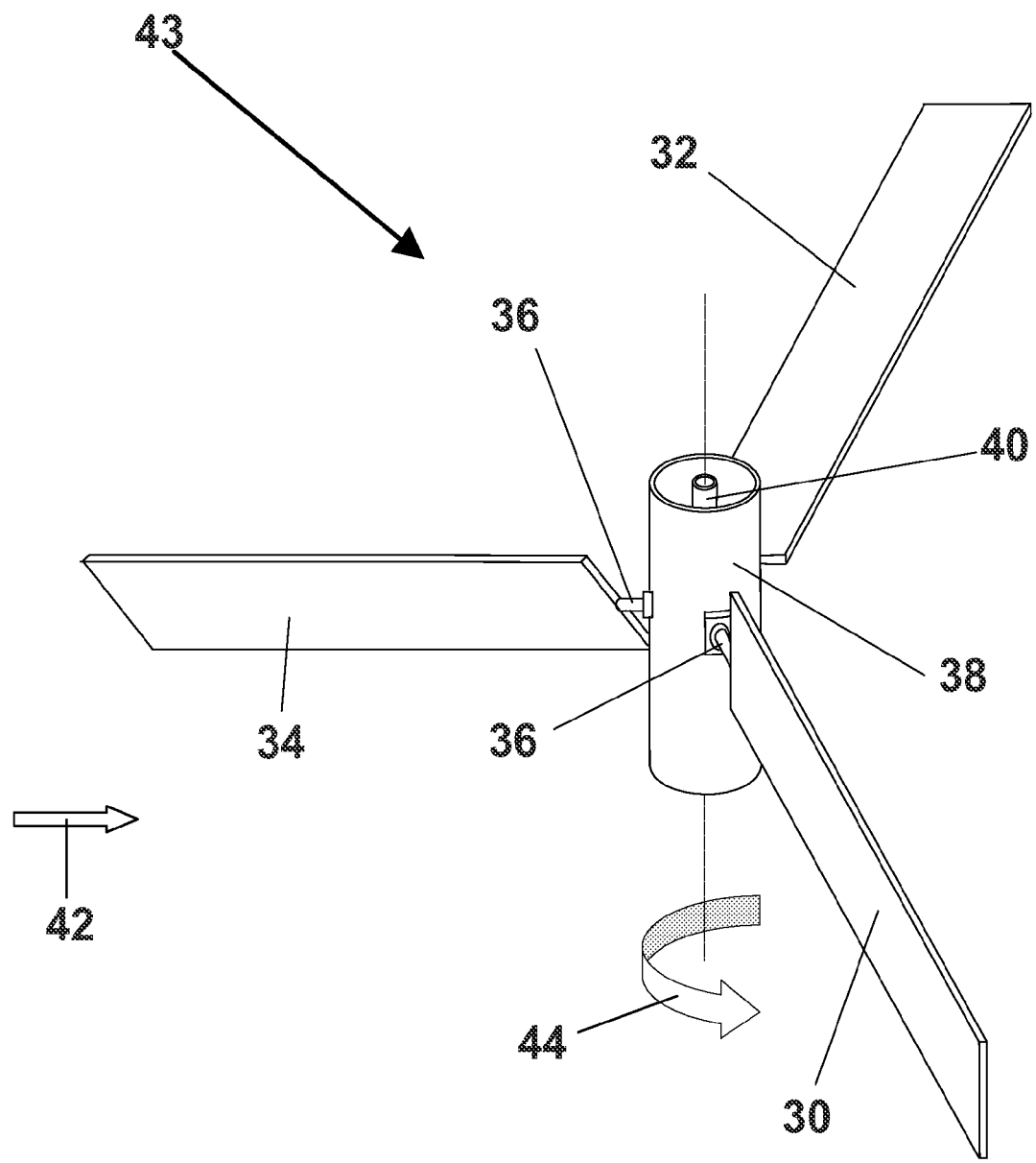
FIG. 1 shows a perspective view of a fluid turbine of an embodiment of the present invention with three blades in the same plane, forming a layer.
Figure 2:
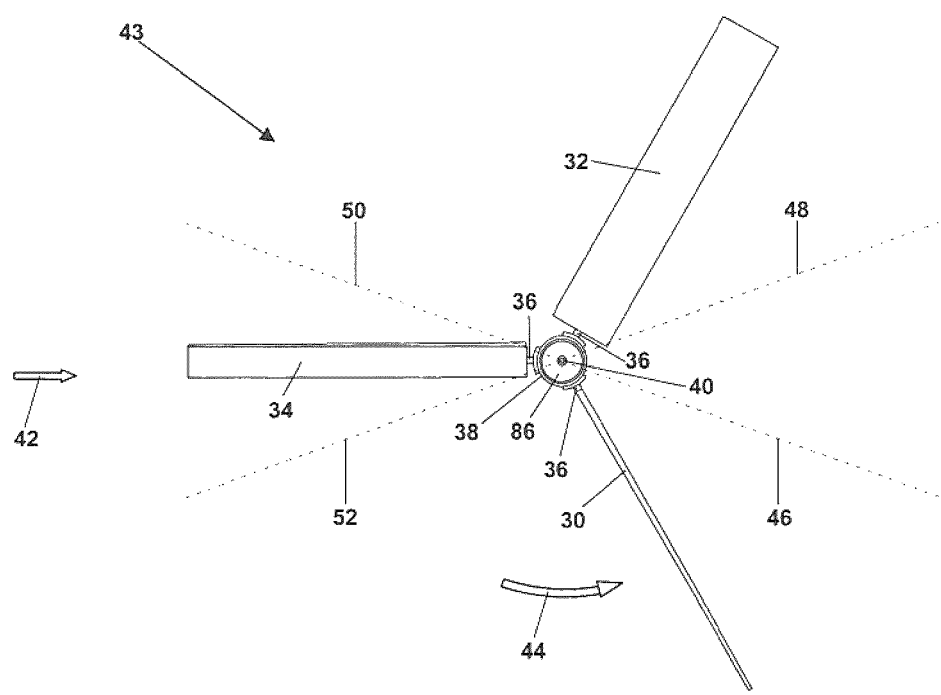
FIG. 2 shows a top plan view of the fluid turbine.
Figure 3A:
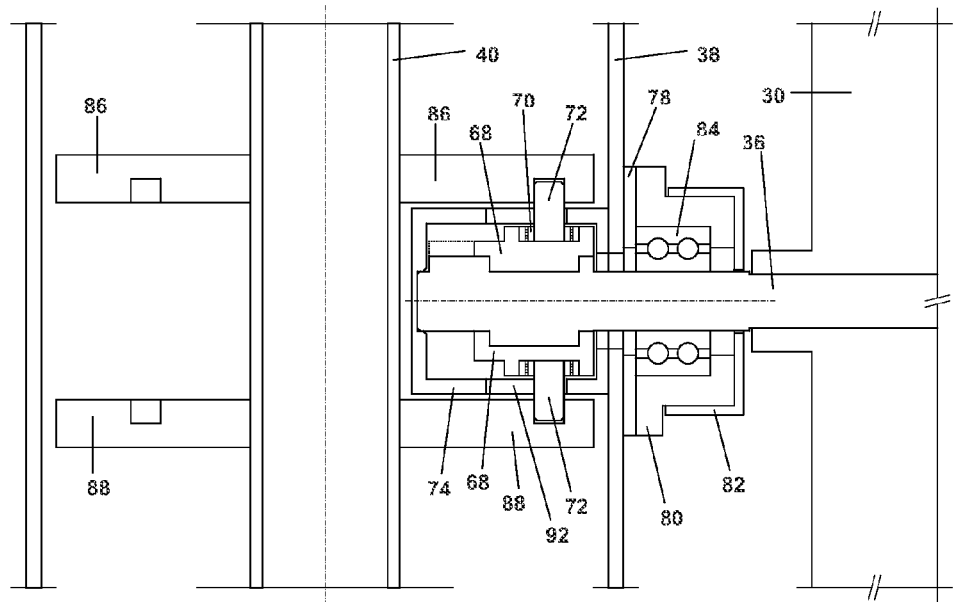
FIG. 3A shows a vertical cross section or side cross-sectional view of the center axis of inner and outer rotor shafts, showing a blade in the vertical position with an actuating device to control the blade position.

An embodiment of the present invention is illustrated in FIGS. 1 and 2. A turbine 43 has a concentric double shaft rotor with an inner rotor shaft 40 providing a center axis and an outer rotor shaft 38 rotates about the longitudinal axis of the inner shaft 40, acting as the energy transmission shaft. Identical blade members 30, 32, 34 are attached to the outer rotor shaft 38 via elongated members or connectors 36. The connectors 36 are rotatably (about its own longitudinal axis) attached to the outer rotor shaft 38, extending outwardly and perpendicular to the rotational axis of the inner and outer shafts 40 and 38, respectively, and the motions or rotations of the connectors 36 are controlled by an actuating device or mechanism as shown in FIG. 3A. In this embodiment of the present invention, the blade members 30, 32 and 34 are rigid flat rectangular stainless steel plates. However, the blade members can be made of any one of suitable/adequately durable materials (for example, alloy or synthetic material) that can withstand the induced stresses from the fluid. The shape of the blades can also be made to be bent, curved, rounded and/or shaped to enhance aerodynamic, hydrodynamic or fluid dynamic effects. The surface of the blades can also be flat or indented. In this embodiment, the outer and inner shafts 38, 40, respectively, and the connectors 36 are made of stainless steel. However, the outer and inner rotor shafts 38 and 40, respectively, and connectors 36 can be of any durable materials that can withstand the torque and bending moment induced.

In FIG. 3A, the blade member 30 of the turbine 43 is connected to the outer shaft 38 via the connector 36 that is rotatably secured by the inner ring of the connector support bearing 84. The connector support bearing 84 is encased by the connector support base 78, and the connector support cover 80 to form a connector support assembly 81. The connector support assembly 81 is fixed to the outer rotor shaft 38 and covered by a seal 82.

Figures 4A, 4B, 4C:
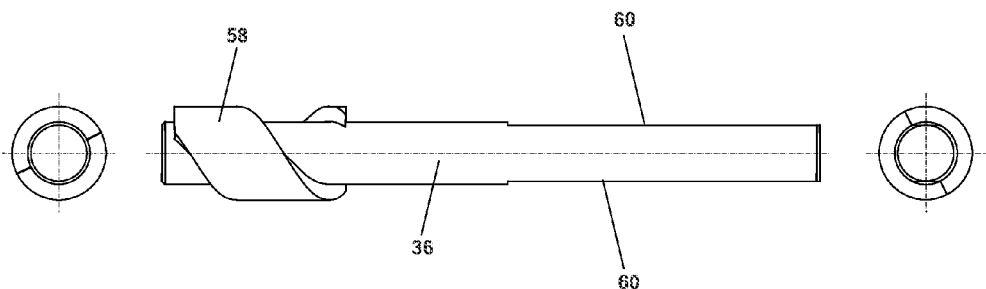
FIG. 4A shows a front elevation view of the connector shown in FIG. 3A in a position when the attached blade is in the vertical position.
FIG. 4B shows a side elevation view of the left end (or the end rotatable connected to the outer rotor shaft) of the connector.
FIG. 4C shows a side elevation view of the right end, (or the end for receiving the blade) of the connector.
Figure 4D:
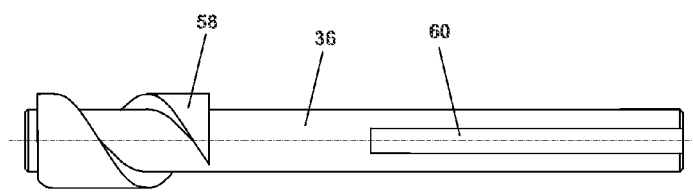
FIG. 4D shows a top elevation view of the connector.
Figure 5A:
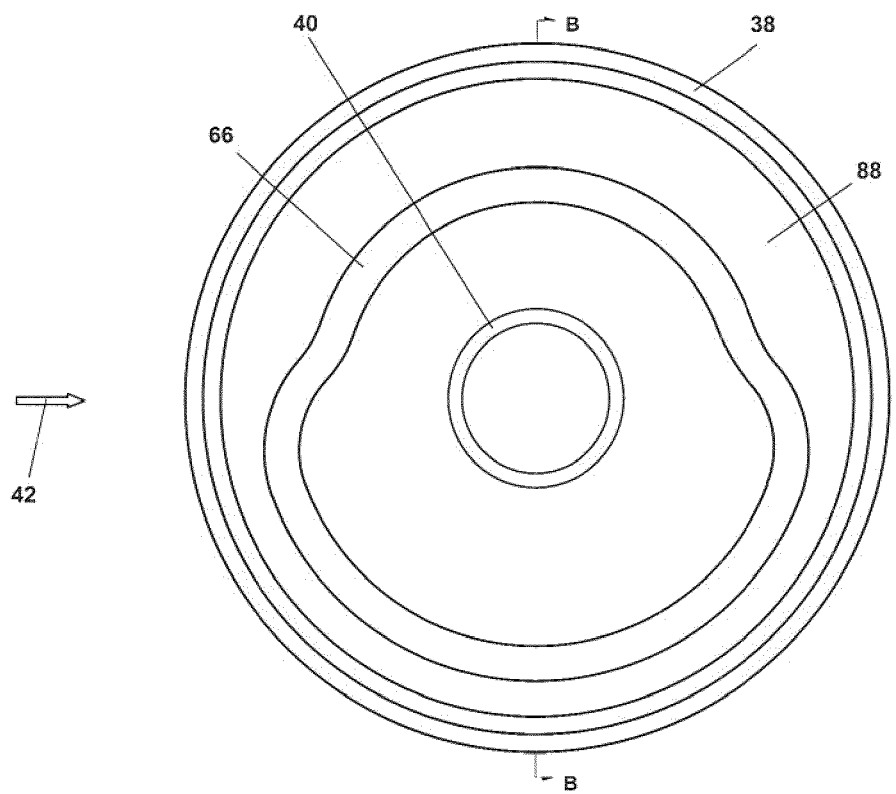
FIG. 5A shows a top cross sectional view of the rotor, showing a lower guiding plate disposed therein.
Figure 5B:
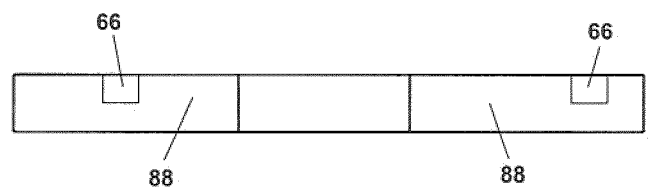
FIG. 5B shows a vertical cross section (or side cross-sectional view) of the lower guiding plate in FIG. 5A at the position B-B.
Figure 6B:
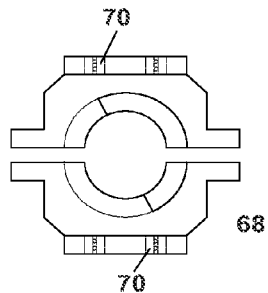
FIG. 6B shows a side elevation view of the left end (or the end facing toward the inner rotor shaft) of the sliding collar.
Figure 6A:
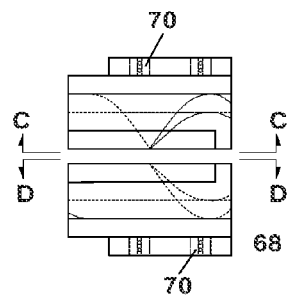
FIG. 6A shows a front elevation view of upper and lower halves of a sliding collar.
Figure 6C:
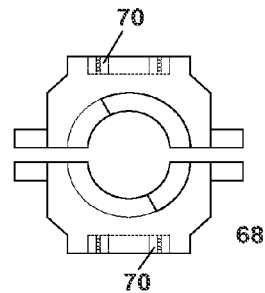
FIG. 6C shows a side elevation view of the right end (or the end facing toward the outer rotor shaft) of the sliding collar.
Figure 6D:
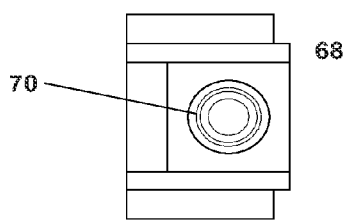
FIG. 6D shows a top plan view of the sliding collar.
Figure 6E:
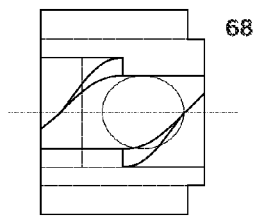
FIG. 6E shows a cross sectional view of the sliding collar in FIG. 6A at the position C-C.
Figure 6F:
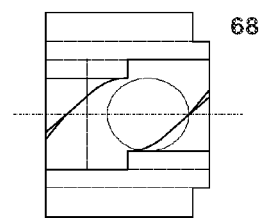
FIG. 6F shows a cross sectional view of the sliding collar in FIG. 6A at the position D-D.
Figure 6G:
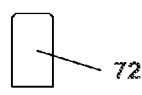
FIG. 6G shows the front plan view of a sliding collar stud.
Figure 6H:
FIG. 6H shows a top plan view of the sliding collar stud.

The connector 36 extends through the outer shaft 38 into the space between the outer shaft 38 and the inner shaft 40. The end of the connector 36, inside the outer shaft 38, has a helical gear 58 as shown in FIGS. 4A and 4D. The helical gear 58 is encased by the sliding collar 68 which has a corresponding gear or an inverse helical gear matching or corresponding to the helical gear 58. The sliding collar 68 is contained in a sliding collar housing 74. The housing 74 restrains the sliding collar 68 from rotational movement but allows the sliding collar 68 to move or to slide longitudinally along axis of the connector 36. The longitudinal motion of the sliding collar 68 is controlled and actuated by guiding patterns or tracks 66, as shown in FIGS. 5A and 5B, on upper and lower guiding plates 86, 88, respectively. The guiding tracks 66 are grooves on the guiding plates 86, 88. The upper and lower guiding plates 86 and 88, respectively, are attached to the inner shaft 40. The sliding collar 68 and upper and lower guiding plates 86, 88, respectively, are linked together via two follower or collar studs 72. The sliding collar 68 has a cavity for collar stud bearings 70. collar studs 72 are held in place by the collar stud bearings 70 and can rotate freely about its axis. The collar studs 72 follows the guiding tracks 66 on the guide plates 86, 88, causing the sliding collar 68 to slide longitudinally along the connector 36. Various views of the sliding collar 68 are shown in FIGS. 6A-6F. Various views of the collar studs 72 are shown in FIGS. 6G and 6H. Various views of the sliding collar housing 74 are shown in FIGS. 7A-7G.

Figure 3B:
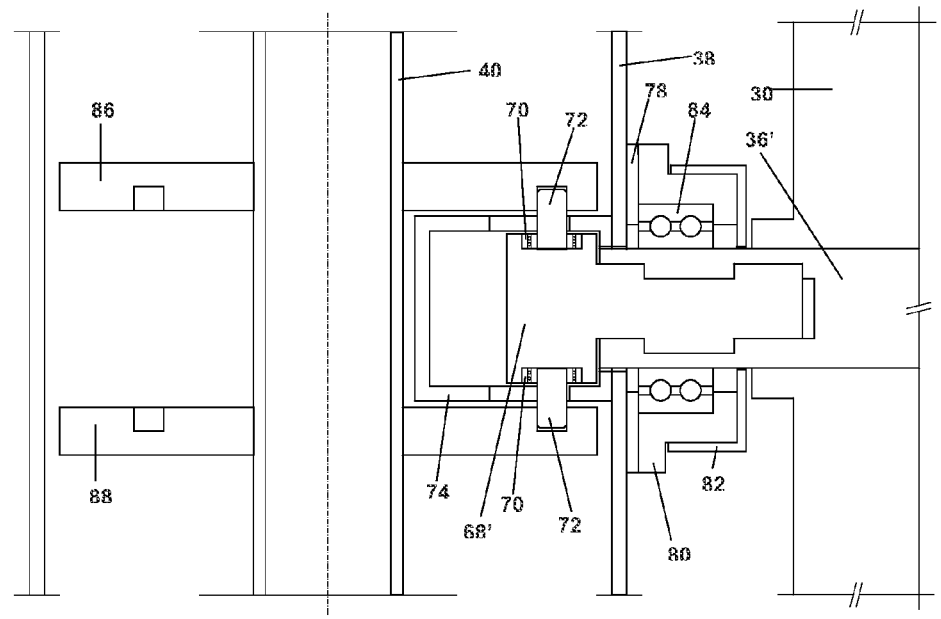
FIG. 3B shows a vertical cross section or side cross-sectional view of the center axis of the inner and outer rotor shafts showing a blade in the vertical position with another embodiment of an actuating device to control the blade position.

FIG. 3B shows another embodiment of an actuating device or mechanism for controlling the blades. In particular, the end of the connector 36' is hollow structure, having an opening at the end facing to the inner rotor shaft 40, having internal helical threads on its inner wall. A shaft member 68', having external helical threads thereon, corresponding to and to be engaged with the internal helical threads on the inner wall of the connector 36'. The shaft member 68' is inserted to the hollow structure from the opening of the connector 36'. The shaft member 68' having studs 72 rotatably connected thereto by the collar stud bearings 70. The shaft member 68' is in communication with the guiding tracks 66 of the guiding plates 86 and 88 via the studs 72. Thus, as the outer rotor shaft 38 of the turbine 43 rotates, it causes the studs 72 to follow the guiding tracks 66, resulting in pushing or pulling the shaft member 68' forward or backward linearly along the longitudinal axis of the connector 36'. The longitudinal movement of the shaft member 68' causes the external helical threads to engage with the internal threads of the connector 36', further causing the connector 36' to rotate accordingly about its longitudinal axis.

The manner, in which the transverse axis turbine operates, rotates in the direction 44 is shown in FIG. 1. Energy in the flowing fluid (for example, wind or flowing water) in a direction 42 is captured by the blade member 30 in a vertical angular position that is blocking the flow of the fluid. The flowing fluid mass loses momentum and kinetic energy because of the blockage and, at the same time, a pressure or force is built up on the frontal surface (which directly receiving the flowing fluid) of the blade member 30. The built up pressure pushes the blade member 30 forward in direction 44 and thus set the outer rotor shaft 38 to rotate about its axis. In this embodiment and the figures, the blade member 30 is functioning as described above. The blade member 30 in the vertical angular position, which is set to an orientation that provides the maximum exposed surface area to the flowing fluid, generates a drag force as the flowing fluid passes to or through the blade member 30. The drag force causes the turbine 43 with the attached blade members 30, 32, 34 to rotate. As the turbine 43 rotates and the blade member 30 reaches transition line 46, as shown in FIG. 2, the pressure built up on the blade member 30 decreases to a very low value because the blade member 30 will be lying at a position very much inclined to the direction of flow and, thus, the blade member 30 will produce minimal blockage effect against the flow. Once the blade member 30 reaches or passes the transition line 46, the blade member 30 is set to start rotating about its longitudinal axis or about the axis of the connector 36, causing the blade member 30 to rotate from the vertical angular position to a horizontal angular position accordingly by the actuating device or mechanism that will be described in detail below. Once the blade member 30 reaches to or passes transition line 48 the blade member 30 will be completely in the horizontal angular position as shown by the blade 32, which is in the horizontal angular position. Once the blade member 30 is in the horizontal position, as illustrated by 32, the blade member 30 provides a minimum exposed surface area to generate the drag force, thus, as the turbine 43 rotates in the direction 44, the blade member 30 in the horizontal angular position cuts through and against the fluid flow direction of 42 without generating any significant drag force against the rotational direction 44. Once the blade member 30 in the horizontal angular position reaches transition line 50 with the rotation of the turbine 43, the blade member 30 will set to start to rotate about its longitudinal axis or about the axis of the connector 36, and will begin to change from a horizontal angular position to a vertical angular position. The blade member 30 is in an inclined position at this point as shown by the inclined blade 34. The inclined blade 34 will continue to rotate about its longitudinal axis or about the axis of the connector 36 as the turbine 43 rotates in the direction of 44 about the axis of the outer rotor shaft 38. Once the blade member 30 reaches or moves beyond transition line 52, the blade member 30 will be completely vertical and has the same vertical profile as the blade member 30 shown in FIG. 2. The turbine 43 will continue to rotate on the transverse axis (about the inner rotor shaft 40) as long as the flow of fluid is sufficient to produce adequate drag on the vertically positioned blade member 30, 32 or 34 to overcome any resistive forces acting on the outer rotor shaft 38.

FIG. 3A shows a structure and mechanism for actuating and controlling angular position of the blade members 30, 32 and 34. For example, each of the blade members 30, 32 and 34 is mounted on the connector 36 which is controlled by the sliding collar 68. As the turbine 43 rotates, the collar studs 72 follow the guiding tracks 66. FIG. 5A shows the top plan view of the lower guiding plate 88 (the top cross sectional view of the inner and outer rotor shaft 40 and 38, respectively, and FIG. 5B shows the side cross sectional view of the lower guiding plate 88. The guiding track 66 on the upper guiding plate 86 corresponds with the guiding track 66 of the lower guiding plate 88. In other words, the guiding tracks 66 on the upper and lower guiding plates 86 and 88, respectively, are mirrored images of each other, and being placed to face each other such that the collar stud 72 interfacing with the guiding track 66 on the upper guiding plate 86 and the collar stud 72 interfacing with the guiding track 66 on the lower guiding plate 88 are guided collaboratively and simultaneously by the guiding tracks 66. Since the upper and lower guiding plates 86 and 88, respectively, are firmly mounted/attached to the inner rotor shaft 40, the orientation of the upper and lower guiding plates 86 and 88, respectively, can be changed or controlled by changing the orientation of or rotating the inner rotor shaft 40. The inner rotor shaft 40 is provided to set the upper and lower guiding plates 86 and 88, respectively, in a desired orientation or angular position corresponding to the direction of flow of the fluid 42 at any given instance. As the turbine 43 rotates, the collar studs 72 follows along the guiding tracks 66, which forces the sliding collar 68 to move longitudinally along the connector 36 outwardly from or inwardly to the inner rotor shaft 40. The motion of the sliding collar 68 is controlled by the shape of the guiding tracks 66. As the sliding collar 68 moves longitudinally along the connector 36, the thread of the corresponding gear provided at inner surface of the sliding collar 68 (as shown in FIGS. 6E and 6F) engages with the helical gear 58 provided at one end of the connector 36, and, thus, the linear/longitudinal movement of the sliding collar 68 causes the connector 36 to rotate about its own axis in one direction or the other, and, therefore, the rotational movement of the blade member 30, 32 or 34 about its own longitudinal axis is controlled by the loci of the guiding tracks 66 on the upper and lower guiding plates 86 and 88, respectively. As the collar studs 72 complete one full loop in the guiding tracks 66, the blade member 30, 32 or 34 also completes one cycle from a vertical position to a horizontal position and then back again to a vertical position.

The aforementioned control and change of angular positions of the blade members 30, 32, and 34 individually allows the turbine 43 to effectively increase drag when the blade is moving with the flow of fluid and minimize drag when the blade is moving against the flow of fluid.

Figure 15:
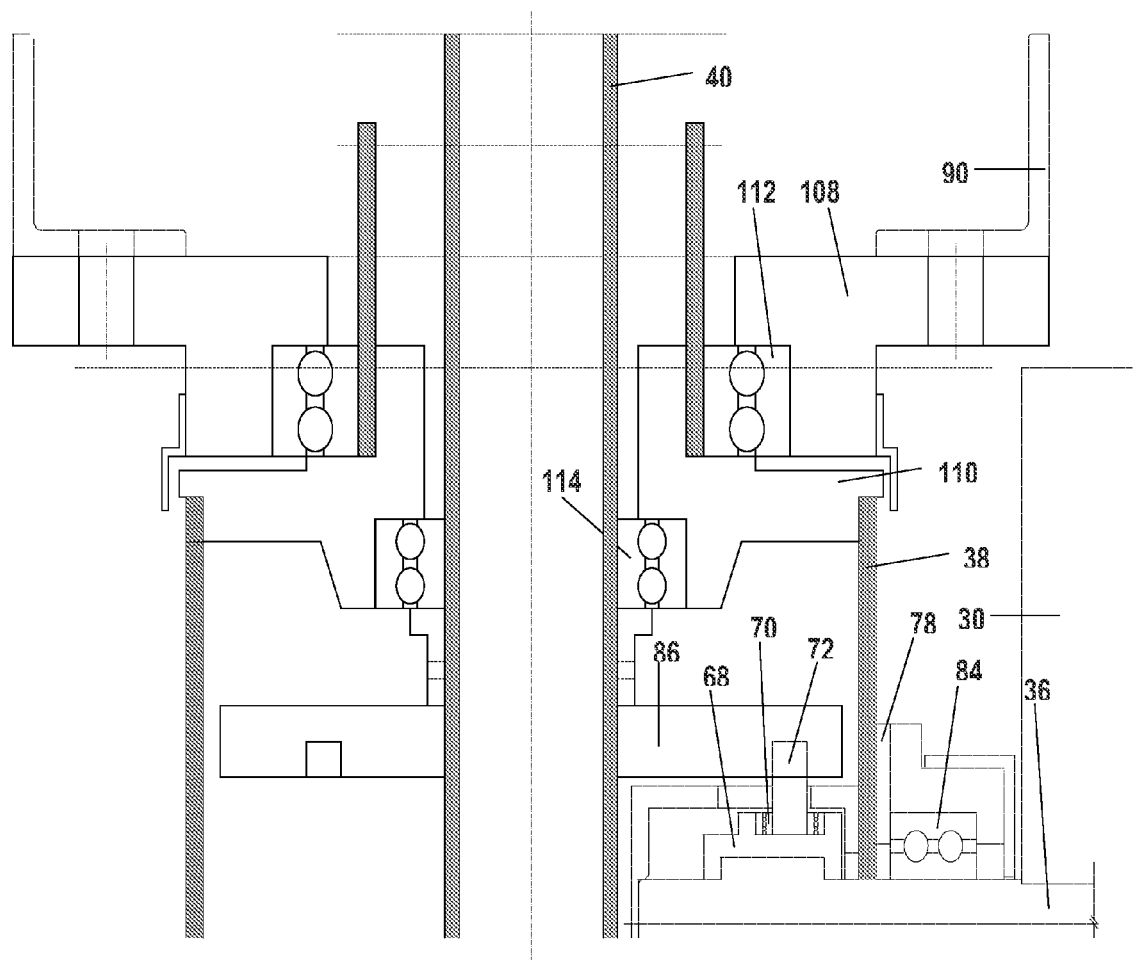
FIG. 15 shows a cross sectional view of one end (for example, upper end) of the rotor.

FIG. 15 shows a cross sectional view of one end (for example, upper end) of the outer and inner rotor shafts 38 and 40, respectively, showing an exemplary base structure or supporting frame 90 for rotatably supporting the outer rotor shaft 38. An upper support upper disk 108 is attached to the frame 90 by a fastening means (not shown). An upper support lower disk 110 is provided and attached to the upper end of the outer rotor shaft 38, and rotatably attached to the upper support upper disk 108 via roller bearing 112 and rotatably attached to the inner rotor shaft 40 via roller bearing 114.

Figure 16:
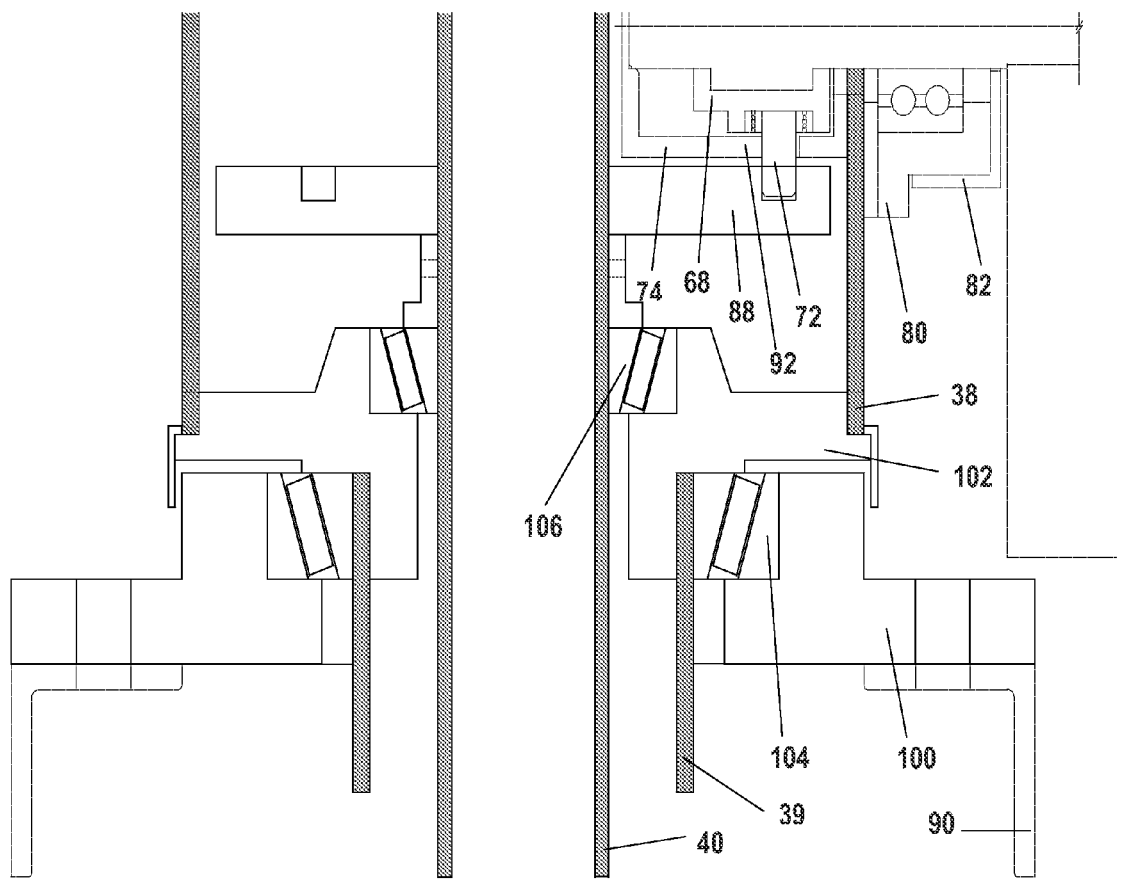
FIG. 16 shows a cross sectional view of the other end (for example, bottom end) of the rotor.

Similarly, as shown in FIG. 16, the other end (for example, bottom end) of the outer and inner rotor shafts 38 and 40, respectively, are rotatably supported by the frame 90. For example, a lower support lower disk 100 is attached to the frame 90. A lower support upper disk 102 is attached to the outer rotor shaft 38, and rotatably mounted on the lower support lower disk 100 by a tapered roller bearing 104, and rotatably connected to the inner rotor shaft 40 via tapered roller bearing 106.

Figure 8A:
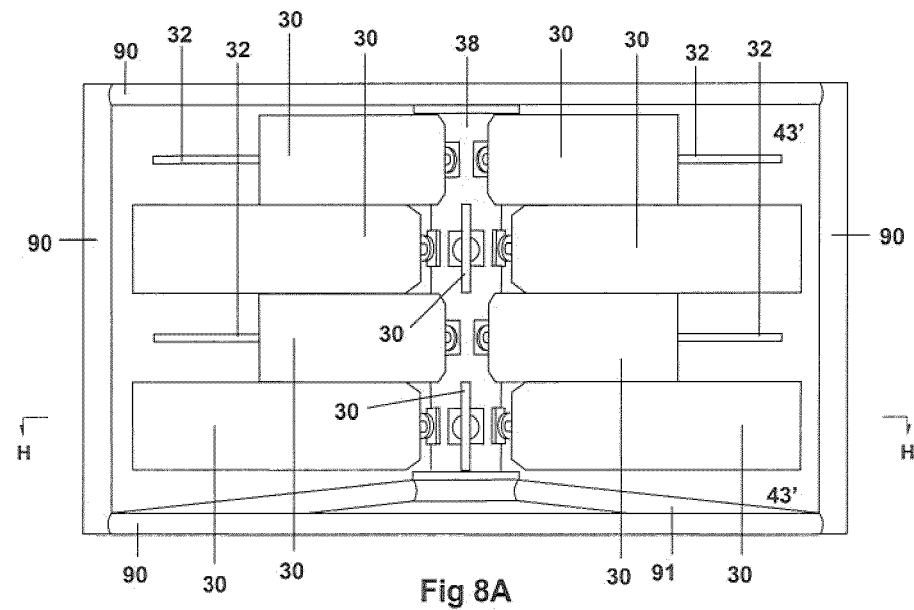
FIG. 8A shows a front elevation view of a typical module having a plurality of fluid turbines on a common rotational axis (rotor shaft) with a square prism frame.
Figure 8B:
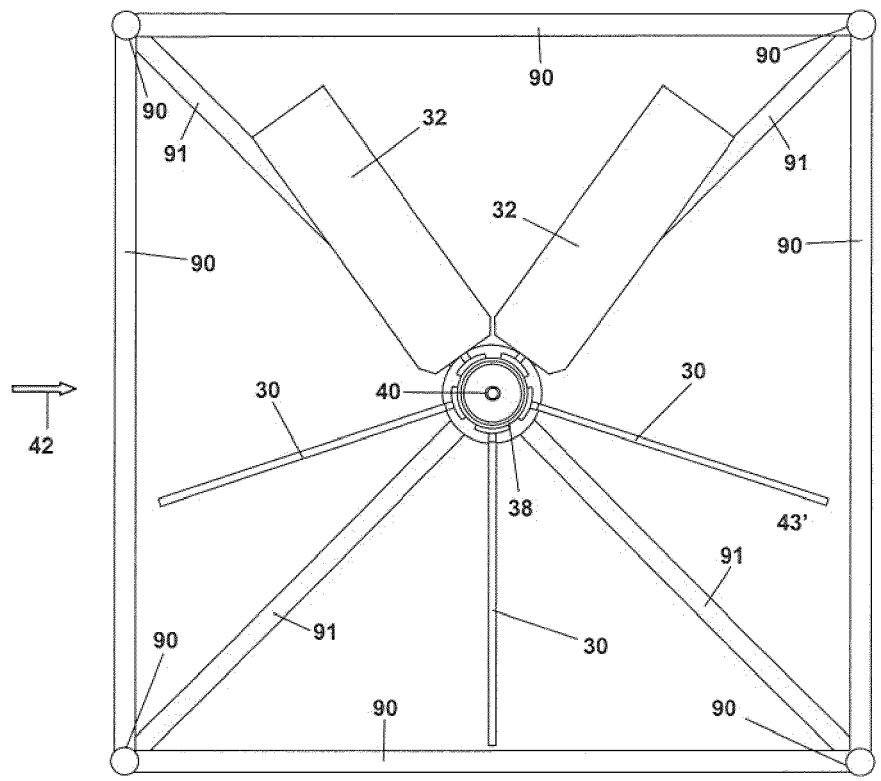
FIG. 8B shows a cross sectional view of the module in FIG. 8A at the position H-H.
Figure 9A:
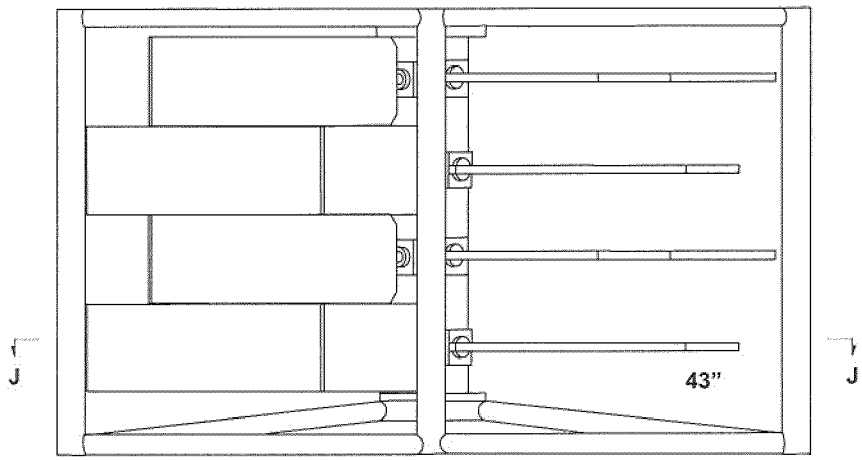
FIG. 9A shows a front elevation view of a typical module having a plurality of fluid turbines on a common rotational axis (rotor shaft) with a hexagonal prism frame.
Figure 9B:
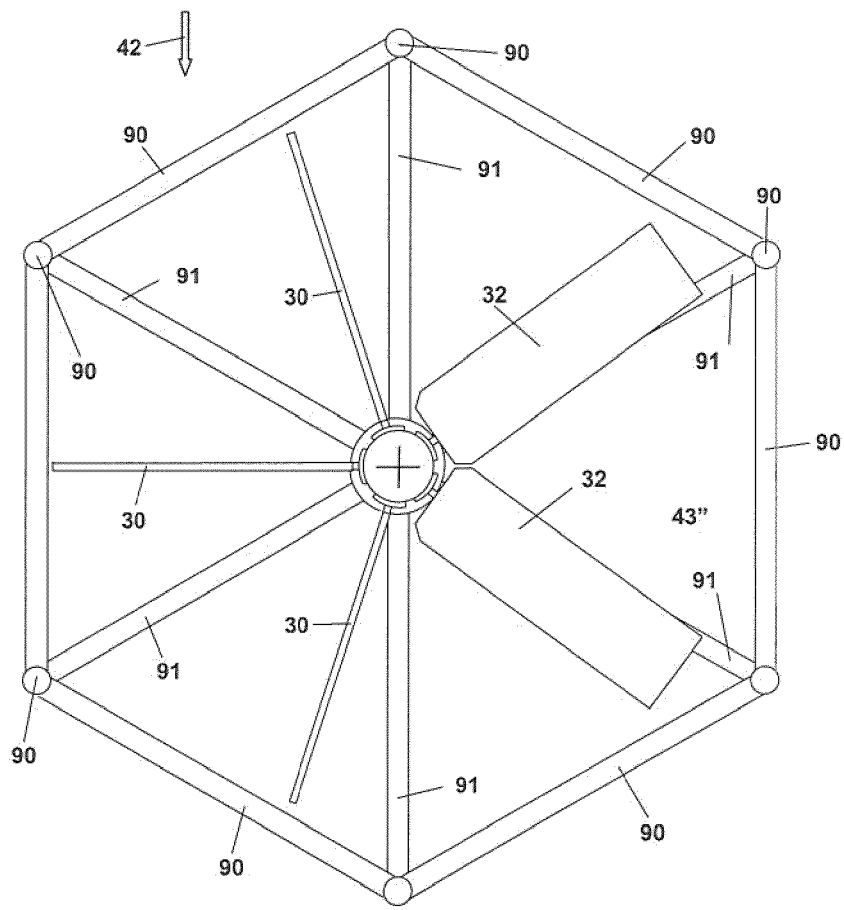
FIG. 9B shows a cross sectional view of the module in FIG. 9A at the position J-J.

A transverse axis fluid turbine of the present invention requires at least three blades mounted on the outer rotor shaft 38, evenly spaced therebetween at an equal angular position for its seamless operations. For example, for three blade configuration, the blades are spaced at 120 degrees. The turbine of the present invention could have a larger number of blades mounted on the outer rotor shaft 38. In addition to the increase in number of blades, multiple turbines in the form of blade layers are joined via the common shafts (i.e. outer and inner rotor shafts 38, 40) to create a turbine module 43' as shown in FIGS. 8A and 8B, and 9A and 9B, respectively. The blade members 30 and 32 in alternative layers are staggered so as to produce a more evenly distributed drag on the outer shaft 38. The turbine module 43' is then supported by a square prism shape structure 90 in FIGS. 8A, 8B or by a hexagonal prism shape structure 90 in FIGS. 9A, 9B for scalability. Bottom frame members 91 are arched upward to provide a space below the outer rotor shaft 38 as shown in FIGS. 8A and 9A.

The turbine module 43' or 43" provides larger effective exposed area on blade members to generate drag by the flowing fluid while utilizing a common rotor shaft or rotor. The module operates in a fashion similar to the embodiment as described above. The blade members are controlled to be in vertical positions when moving along in the direction of the flow of fluid and to be in horizontal positions when moving against the direction of the flow. The turbine module 43' or 43" allows for multiple turbines to rotate in unison on the two common shafts. The structural frame enhances the turbine module 43' or 43" by providing support and allows for numerous turbine modules 43' or 43" to be joined together.

Figure 10C:
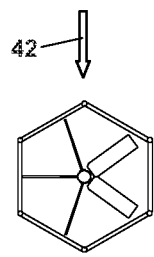
FIG. 10C shows a cross sectional view of the modules in FIGS. 10A and/or 10B at the position K-K.
Figures 10A, 10B:
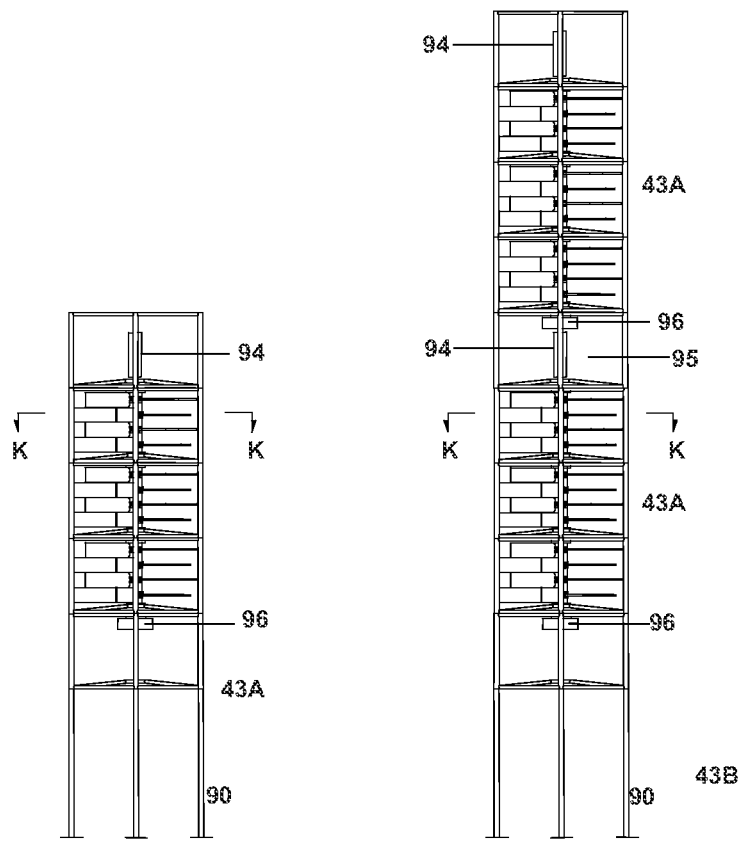
FIG. 10A shows a front elevation view of a module of turbines with direction vane and energy conversion device in a supporting frame forming a self standing structure for a wind mill application.
FIG. 10B shows a front elevation view of two modules of turbines jointed vertically with direction vane and energy conversion device in a supporting frame forming a self standing structure for a wind mill application.

Referring to FIG. 10A, the transverse axis fluid turbines are combined into a turbine system 43A with a wind direction vane 94 and an energy conversion device 96 in a frame 90. In FIG. 10B, an additional turbine module 43', direction vane 94 and energy conversion device 96 are joined together in a same frame 90.

The turbine systems 43A and 43B as shown in FIGS. 10A and 10B, respectively, have the added benefit from the direction vane 94. The direction vane 94 comprises a sensor or sensing device (not shown) to detect the direction of the fluid flow and provides instant fluid flow direction information to the turbine systems 43A and 43B, and hence it enables the turbine systems 43A and 43B to control the orientation of the inner rotor shaft 40, for example, to change blade positions more effectively to adjust with the changing fluid flow directions. Thus, the direction vane 94 allows the turbines to operate in a fluid with changing flow direction.

Figure 11B:
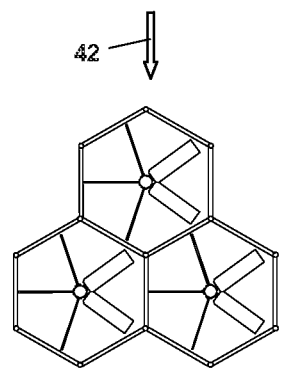
FIG. 11B shows a cross sectional view of the turbines in the tower configuration in FIG. 11A at the position L-L.
Figure 11A:
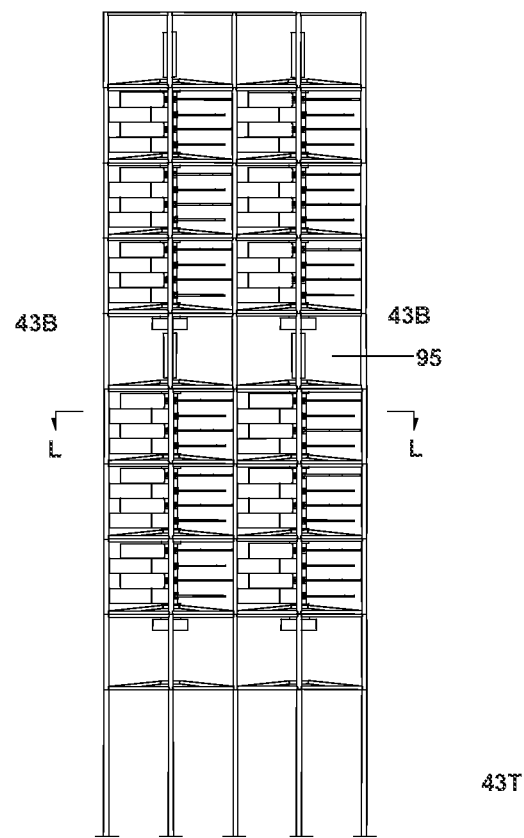
FIG. 11A shows a front elevation view of a turbines in a tower configuration or a plurality of modules with hexagon prism frames jointed vertically and horizontally together.
Figure 12B:
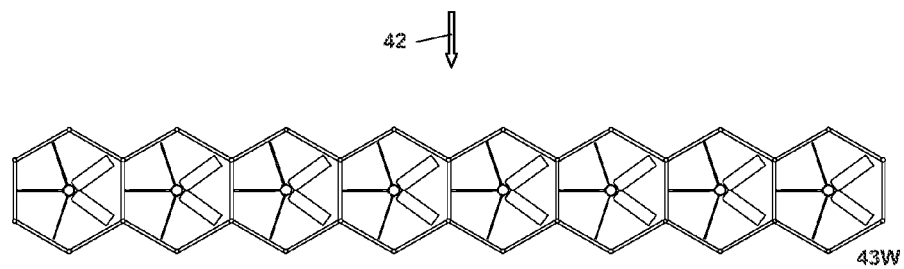
FIG. 12B shows a cross sectional view of the turbines in the wall configuration in FIG. 12A at the position M-M.
Figure 12A:
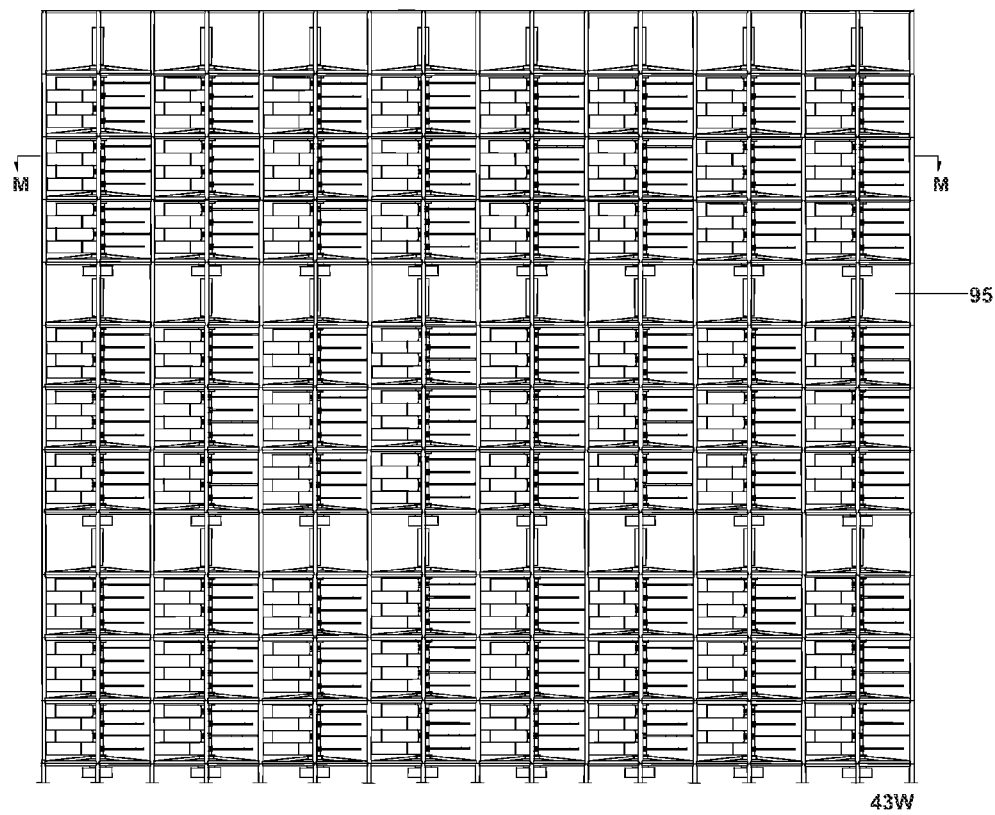
FIG. 12A shows a front elevation view of the turbines jointed/connected in a wall configuration.
Figure 13:
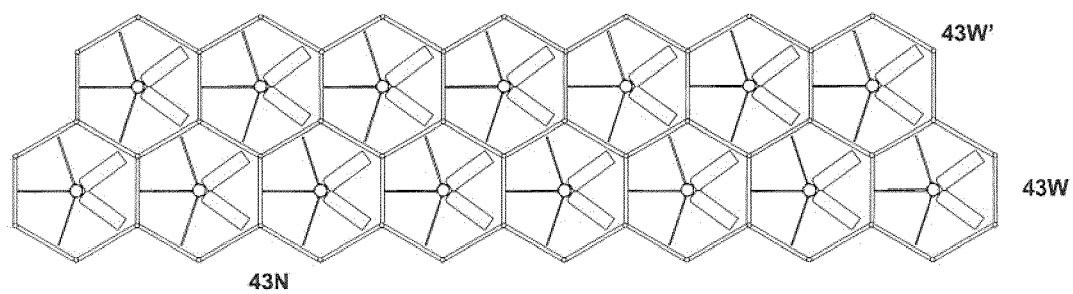
FIG. 13 shows a top cross sectional view of the turbines jointed/connected in a net configuration.

The turbine system 43B of FIG. 10B have a couple of the turbine systems 43A joined together to form a tower structure. A plurality of turbine systems 43B may further be joined laterally together to form another tower structure 43T as shown in FIGS. 11A and 11B. A plurality of turbine systems 43B can further be joined together to form a wall of turbines as shown in FIGS. 12A, and 12B. Two walls of turbines 43W and 43W' can also be assembled into a net of turbines 43N as shown in FIG. 13, by staggering the two walls.

Figure 17:
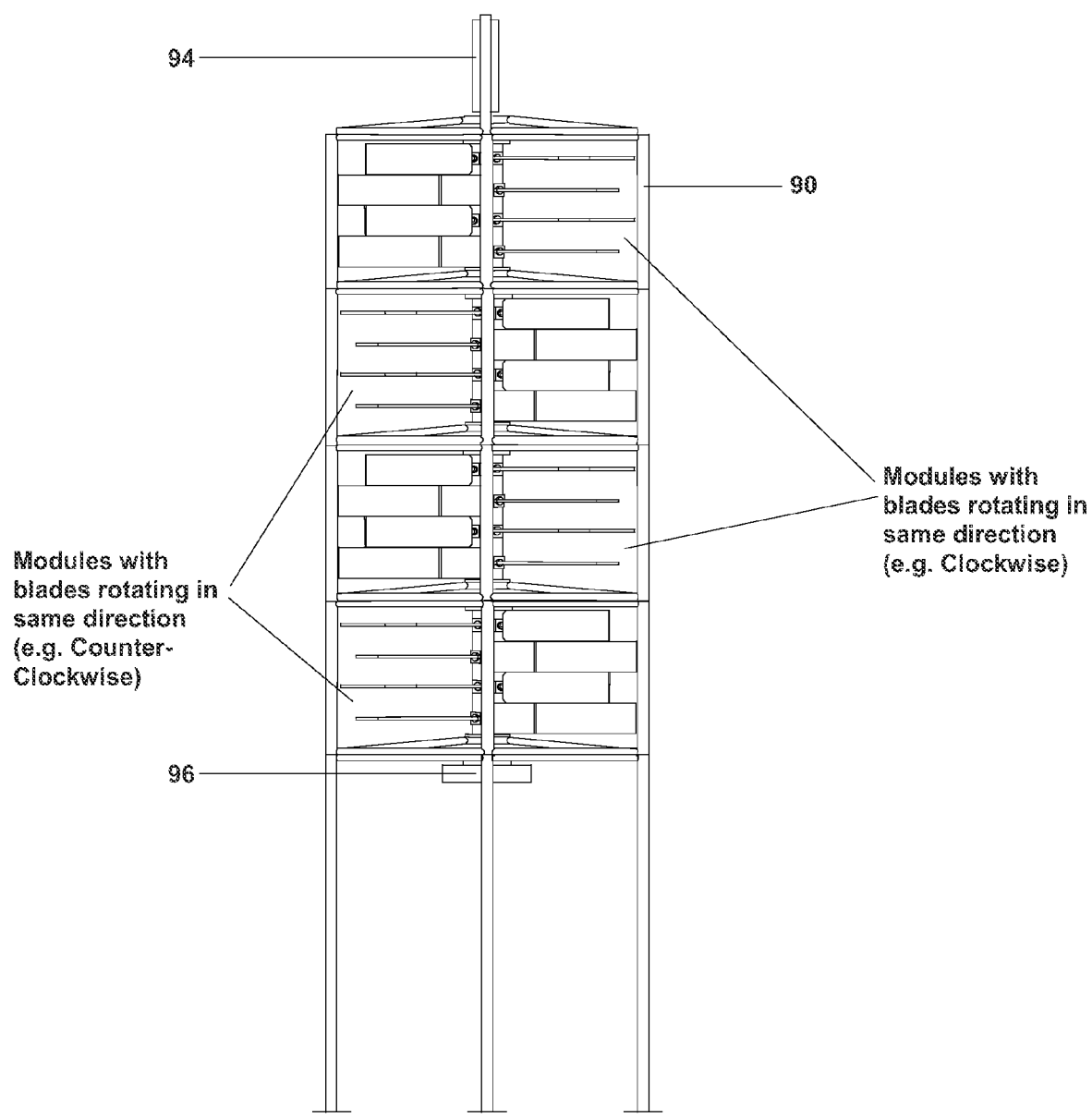
FIG. 17 shows a front plan view of four turbine modules connected on top of each other, two of which rotate in the opposite direction from others.

In constructing larger structure with a plurality of turbines of the present invention, it is often effective to alternate direction of the rotation of turbines, i.e. one turbine rotates in clockwise direction, and an adjacent turbine rotates in counter-clockwise direction as shown in FIG. 17. In such case, one or more counter rotating modules may be included in each turbine system.

Referring back to FIG. 10B, the turbine system 43B is very scalable and it can be joined together with another to form larger structure(s). The system 43B operates in the same fashion as described earlier. Larger structures typically have higher yield and greater efficiency for extracting energy from the fluid. A net of turbines or a plurality of turbines connected together to form a net structure (i.e. 43N), in particular, captures almost double the amount of energy as compared to a wall of turbines with the same frontal area facing the fluid. The construction cost is also reduced as there are more common structural members among modules.

Figure 14:
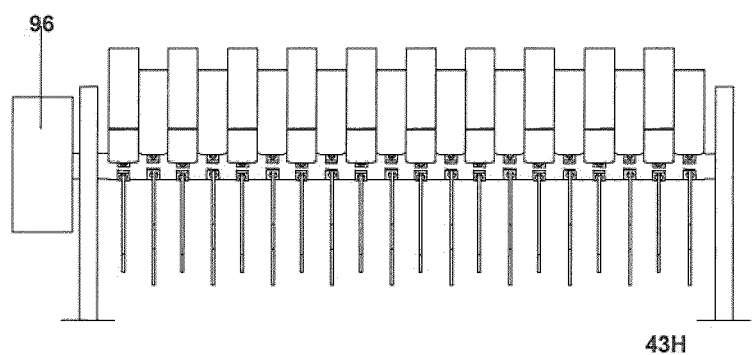
FIG. 14 shows a transverse axis turbine with a horizontal axis of rotation.

Now referring to FIG. 14, the transverse axis fluid turbines are placed horizontally, respective to the bottom floor (not shown). The energy conversion device 96 is mounted to the turbine module 43H at one of the ends of the shaft. The turbine system 43H is particularly useful for situations where the horizontal placement of the turbine is more beneficial.

From the foregoing, a number of advantages of the present invention become evident:

(a) Fluid turbines of the present invention can be fully immersed in the fluid and convert the energy in the flowing fluid into rotational mechanical energy without additional devices.

(b) With the use of the direction vane, the fluid turbines will be able to extract energy from the flowing fluid without or minimal interruption by following the direction of flow of the fluid (specifically for, for example, a wind mill application). In addition, sudden changes in fluid flow directions would not have significant negative effects on the turbine system.

(c) The capability of the turbine and turbine module to operate with vertical or horizontal rotor shaft axes much widens the scope of application of the turbine and turbine system, (d) With the transverse axis turbine structure, fast flowing fluid will not adversely affect the operation of the turbine and the operation of the turbine will not be required to shut down. This allows the turbine to capture energy under various conditions.

(e) The use of a frame structure allows modules to be joined together to form large structures such as a tower, a wall, a net or any other structural formation to suit site conditions at various locations. Built-up structural system allows more surface area to capture energy with higher efficiency.

(f) Modular construction of the turbine system provides for easy transport, easy handling and lower construction cost.

(g) Simplicity in the construction of the turbine results in lower fabrication and maintenance cost.

(h) The transverse axis turbine is a slow rotation machine. It produces significantly less noise than the fast rotating airfoil type turbines.

(i) Slow rotation speed reduces risk to animals.

Accordingly, it is to be understood that the transverse axis fluid turbine of the present invention can be used to effectively harness energy from flowing fluid into usable mechanical energy. Entire turbine of the present invention is allowed to be fully immersed in the flowing fluid. Additional components are not required to divert or to shelter the blades from the flow so as to reduce drag when the blades are moving against the flowing fluid. Even with components to divert the flow or to shelter blades from the fluid flow, blades with large frontal area moving in motionless fluid will still be subjected to significant drag. Such drag force will greatly reduce the efficiency of the turbine system. The change of frontal exposed surface to only a small fraction as illustrated by the embodiment in FIG. 1 is much more efficient in reducing drag when the blades are moving against the fluid flow.

In addition, turbines of the present invention are scalable in its size and construction; a plurality of turbines or turbine modules of the present invention can be so joined together to build a larger and more efficient turbine. Furthermore, structural frame support integrated with the turbines provides additional advantages in that:

(a) it allows modules of turbines to be stacked up and allows the number of turbines to be scalable;

(b) it permits structures of various sizes to be built, namely from a single module to a tower, to a wall and to a net of turbines with almost no limitation on size. Increase in the number of turbines increases the efficiency and the amount of energy captured.

While the present description provides various specific embodiments and features, these should not be construed as limitations on the scope of any one of embodiments presented herein, but as exemplifications of the presently disclosed invention. Many other modification and variations are possible without departing from the spirit of the invention described herein. For example, the blades can be shaped differently, such as having an oval, curved bowl shape or any aerodynamically, hydrodynamically or fluid dynamically enhanced shape; the turbine can be rotating on axes of various orientation; the control for the blades can be electro-magnetic, hydraulic, and etc.

The invention claimed is:

1. A transverse axis fluid turbine, comprising:
  a. a base structure;
  b. a rotor rotatably attached to the base structure, having the axis of the rotor being traverse to the direction of flowing fluid;
  c. at least three blades, each of which comprising:
    i. an elongated member having first and second ends;
    ii. a bearing support mounted to the rotor, rotatably receiving the first end of the elongated member to the rotor, allowing the elongated member to rotate about the longitudinal axis thereof;
    iii. a blade member attached to the second end of the elongated member, extending radially from the rotor;
    iv. an helical gear disposed at the first end of the elongated member;
    v. a corresponding gear to the helical gear;
  d. an actuating device disposed within the rotor, the actuating device comprising:
    i. an inner rotor shaft rotatably disposed within the rotor, having its axis being the same as the axis of the rotor;
    ii. a guiding plate attached to the inner rotor, the guiding plate having a guiding pattern thereon and
    iii. a corresponding guiding plate attached to the inner rotor, the corresponding guiding place faces with the guiding plate and having a corresponding guiding pattern thereon; and
    vi. a follower attached to the corresponding gear to follow the guiding pattern and the corresponding guiding pattern, causing the corresponding gear to slide longitudinally along the first end of the elongated member, further causing the corresponding gear to engage with the helical gear and to actuate the elongated member to rotate about the longitudinal axis of the elongated member to control the effective exposed area of the blade accordingly to the direction of flowing fluid; and
  wherein the guiding pattern and the corresponding guiding pattern are grooves and the follower is a stud operably engaging with the guiding pattern and the corresponding guiding pattern.

2. The transverse axis fluid turbine as recited in claim 1, wherein the blade is made of one of stainless steel, metal and alloy.

3. The transverse axis fluid turbine as recited in claim 1, wherein the blade is made of a synthetic material.

4. The transverse axis fluid turbine as recited in claim 1 further has more than three blades.

5. The transverse axis fluid turbine as recited in claim 1, wherein the base structure is a frame in a polygonal prism shape.

6. The transverse axis fluid turbine as recited in claim 5, wherein the polygonal prism shape is square or hexagon.

7. The transverse axis fluid turbine as recited in claim 1 further comprises a direction vane for detecting the direction of fluid flow, being in communication with the actuating device to adjust and to control the actuating device according to the direction of the fluid flow.

8. The transverse axis fluid turbine as recited in claim 1, wherein the base structure is vertically stackable on another.

9. The transverse axis fluid turbine as recited in claim 1, wherein the base structure is laterally connectable to another.

10. The transverse axis fluid turbine as recited in claim 1, wherein the helical gear is threaded externally and the corresponding gear is threaded internally.

11. The transverse axis fluid turbine as recited in claim 1, wherein the helical gear is threaded internally and the corresponding gear is threaded externally.

12. A fluid turbine system, comprising a plurality of the transverse axis fluid turbines as recited in claim 1 stacked on top of the other to form a tower.

13. A fluid turbine system, comprising a plurality of the transverse axis fluid turbines as recited in claim 1 connected vertically and laterally to form a wall structure.

14. A fluid turbine system, comprising a plurality of the wall structures of the fluid turbine systems as recited in claim 13 being connected in layers to form a net structure.

* * * * *

UNITED STATES PATENT AND TRADEMARK OFFICE
CERTIFICATE OF CORRECTION

PATENT NO.         : 8,414,266 B2  
APPLICATION NO.    : 12/500330  
DATED              : April 9, 2013  
INVENTOR(S)        : Chi Hung Louis Lam et al.

Page 1 of 1

It is certified that error appears in the above-identified patent and that said Letters Patent is hereby corrected as shown below:

On the title page, item (54) and in the specification, col. 1, title, delete "Traverse" and insert
--Transverse--

Signed and Sealed this
Twenty-eighth Day of January, 2014

Michelle K. Lee
*Deputy Director of the United States Patent and Trademark Office*